Patented July 29, 1930

1,771,786

UNITED STATES PATENT OFFICE

MORTIMER T. HARVEY, OF EAST ORANGE, NEW JERSEY, ASSIGNOR TO THE HARVEL CORPORATION, OF NEWARK, NEW JERSEY, A CORPORATION OF NEW JERSEY

COMPOSITION AND METHOD AND STEPS FOR MAKING AND USING THE SAME

No Drawing.    Application filed January 8, 1930.    Serial No. 419,462.

The present invention relates to method, materials, products, and compositions involving the reaction of cashew nut shell liquid and sulphur or sulphur compounds. The products, materials, and compositions of the invention are suitable for use in or as coatings, impregnations, waterproofings, molded parts, electrical insulation, rubber and rubber substitutes, and for use in the arts generally.

The invention further consists in the new and original processes and arrangements and combinations of steps in the processes hereinafter described and claimed; and the invention also consists in the products, compositions and materials having the general characteristics, the new and useful applications, and the several features of utility hereinafter set forth and claimed.

I have discovered that cashew nut shell liquid can be modified with sulphur to produce materials useful in the arts generally. Cashew nut shell liquid plasticizes sulphur; but, in addition to this relation, cashew nut shell liquid and sulphur can be reacted to produce products varying in general characteristics in accordance with the relative proportions, manner of treatment and so on. The modification of the cashew nut shell liquid is in the nature of a chemical reaction between the cashew nut shell liquid and the sulphur, and various kinds of materials can be prepared ranging from liquids to solids. Heat is usually necessary to initiate and carry on the reaction, and the consistency of the reaction product depends upon the amount of sulphur used and also upon the length of time and temperature of heating.

Particular illustrative examples of the temperatures and time of heating, the amounts of the materials used, and the nature and characteristics of the products will now be given.

When about seven to twenty parts by weight of sulphur are intermixed with ninety-three to eighty parts of cashew nut shell liquid, and the mixture heated at about 280° F. for about one hour, reaction products are obtained which, along the range, vary from sticky material to rubbery or gummy material. These materials, when heated, soften and can be applied as coatings by dipping or by means of doctor blades or rolls. In this manner, in the case of a coating, a film can be produced which is strong and flexible, and which is impervious to water and moisture. The dried reaction product is insoluble in alcohol, gasoline, other petroleum oils and other common solvents. Materials prepared in this way are suitable in making gaskets, hose for gasoline and other materials which ordinarily dissolve rubber, and for other purposes. And the material can be prepared and applied in continuous process as for dipping or the like for covering electric conductors, for making resilient cushions, mats, or blocks and for general use where rubber, cork and other resilient materials are used.

As a general classification, which is merely illustrative and not limiting because the lines of demarcation are not clear cut in every case, it is to noted that when sulphur in amounts up to about seven per cent is used the reaction product is a liquid which is sticky or tacky at room temperature and which will dry at increased temperatures; in those cases in which from about seven to about twenty per cent of sulphur is used the product is rubbery, and at the lower part of this range is sticky, the stickiness disappearing with increase in percentage of sulphur and being replaced by a softness and pliability characteristic of partly vulcanized rubber.

When greater percentages of sulphur are used, products of increasing degrees of stiffness, hardness and so on are obtainable with equal temperatures and times of heating; as an example, when about seventy per cent of cashew nut shell liquid by weight to thirty per cent of sulphur are heated at about 400° F. for about two hours a product resembling hard rubber is obtained. Similar products are obtained when the percentage of the sulphur is increased, hard rubber like materials being obtained with equal parts of sulphur and cashew nut shell liquid and with still higher percentages. These products pass through a tough, rubbery intermediate stage.

In all the above specific examples the cashew nut shell liquid is brought up to a temperature of 600° F. and then let cool in an open vessel to drive off moisture and to give the liquid a drying characteristic; but the liquid can be refluxed at this given temperature for one hour, for example; or the liquid can be heated in the open vessel or refluxed at other temperatures lower or higher than that given; and, also, the raw commercial cashew nut shell liquid can be used. Whether or not the liquid is heat treated is dependent upon the use to which the product is to be put and on the nature of the handling of the product. For example, when it is necessary or desirable to heat the prepared material, the sulphur reaction product, at lower temperatures or for short periods of time at the final stages the cashew nut shell liquid is preheated. An example of such a case is the impregnation of canvas or the like to make gaskets or other articles, the reason for the necessity of using lower temperatures being that the canvas can be burnt or weakened by too much heat.

The materials of the invention are highly suitable in making hot or cold molded articles and products either with or without fillers such as are commonly used with rubber, shellac, linseed oil, and so on. Also, the materials of the invention can be used together with linseed oil, tung oil and the like in making coatings, molded compositions and so on, for example, to impart the qualities of water resistance, oil resistance and so on to coatings or molded compositions made of linseed oil, tung oil, or the like, such as are commonly known.

Reaction products of cashew nut shell liquid and sulphur in which the latter is present in amounts as low as one per cent and lower can be used in varnishes and coatings to impart or preserve the quantity of flexibility because the products of the invention are stable at normal temperatures and at higher temperatures below the reacting temperatures of the sulphur and cashew nut shell liquid. The reaction products of the invention appear to limit or retard oxidation or ageing both in themselves and in products in which they are intermixed.

An example of a molding composition is, one hundred parts by weight of zinc oxide, two hundred of flint, one hundred and fifty parts of asbestos, one hundred parts of raw commercial cashew nut shell liquid, and forty parts of sulphur, intermixed, pressed to form, and heated at about 400° F. for one to four hours depending on thickness of the wall of the article made. Another example is ninety-five parts by weight of talc, ninety-five parts of asbestos feathers, fifty parts of raw commercial cashew nut shell liquid and twenty parts of sulphur, intermixed together, pressed to shape and heated for one to four hours at about 400° F. Asbestos feathers is a form of asbestos in which shreds have been separated and fluffed out to have somewhat the appearance of feathers. When the mixture is heated for about five to fifteen minutes the material has begun to set but is soft and is suitable for cutting up in slabs of approximate size for putting into molds. Also the material in the soft state can be rolled into sheets or panels and then further cured to set.

This application is a continuation in part of my copending application Serial Number 119,990, filed July 1, 1926 in so far as reactions of sulphur and cashew nut shell liquid are concerned.

Having thus described my invention, what I claim and desire to protect by Letters Patent is:

1. Sulphurized cashew nut shell liquid.
2. As a new article of manufacture, material which is the heat reaction product of cashew nut shell liquid and sulphur.
3. The method which comprises heating cashew nut shell liquid together with sulphur and thereby securing a reaction between them.
4. A material, formed by heating cashew nut shell liquid and sulphur and having characteristics of rubber which has been heated with sulphur.
5. A material formed by heating cashew nut shell liquid and sulphur to at least about 240° F.
6. The method which comprises pre-heating cashew nut shell liquid and subsequently reacting sulphur therewith with the aid of heat.
7. The method which comprises pre-heating cashew nut shell liquid and subsequently reacting sulphur therewith.
8. The method which comprises heating cashew nut shell liquid to at least about 400° F. and reacting it with sulphur.
9. The method which comprises heating cashew nut shell liquid and sulphur together to at least about 240° F.

Signed at Irvington, in the county of Essex and State of New Jersey this 8th day of January 1930.

MORTIMER T. HARVEY.